UNITED STATES PATENT OFFICE.

GEORGE B. CHITTENDEN, OF CHILITO, ARIZONA.

ART OF EXTRACTING COPPER.

1,104,410.　　　Specification of Letters Patent.　　Patented July 21, 1914.

No Drawing.　　Application filed May 21, 1914. Serial No. 840,100.

*To all whom it may concern:*

Be it known that I, GEORGE B. CHITTENDEN, a citizen of the United States, residing at Chilito, in the county of Gila and State of Arizona, have invented certain new and useful Improvements in the Art of Extracting Copper, of which the following is a specification.

My invention relates to the art of extracting copper from its ores and relates more particularly to that wet process of extraction whereby the copper content of such ores has become dissolved in acid-reacting water.

My invention further relates to the reagent used for precipitating the copper from the acid solution.

The primary object of my invention is to provide a rapid, cheap and efficient process adapted for extracting copper from the before-mentioned acid solution, which process is practicable in application under all conditions which occur in nature with acid copper-containing liquids or those produced by similar means in the arts.

A further object of my invention is to provide a cheap and efficient reagent adapted for use in acting upon the acid solution to precipitate the copper therefrom.

In carrying out my invention, the copper ore, after having been reduced to a more or less powdered or comminuted condition, is placed in tanks and then leached with dilute sulfuric acid or its equivalent, of greater or less strength as desired, until the result sought is accomplished. The described step of leaching with dilute sulfuric acid or its equivalent is well known and forms no part of my invention. After the leaching has been terminated, the solution is filtered and lime water in excess is added to the solution until the mixture becomes of a bluish color and reacts alkaline owing to the added lime water, and then so soon as the entire mass of liquid has assumed the described color and shows the alkaline reaction the addition of lime water is discontinued.

Immediately the mixture has become alkaline, a precipitation of a flocculent green colored precipitate takes place. This precipitate carries from twenty to forty per cent. copper according to the impurities taken out of the ore in the leaching process. This precipitate settles promptly and within a few hours has separated from the solution and the remaining liquid may be run off and is found to be free from copper and may be again used in further treatment of ore.

The described step of adding lime water to an acid solution containing copper, or vice versa, is an essential feature of my process. In the use of lime water it is not necessary to exercise that exact care in its addition to the acid solution that is required in processes where milk of lime or similar reagents are used. Nor is agitation, stirring or other aids to mixing required, and nodule formation through which foreign inclosures are caused and the ensuing losses in precipitation, handling and extraction, are prevented.

The precipitate obtained by my process and the described reagent, *i. e.* the lime water, is green in color and of low specific gravity, but after being subjected to a moderate heat by which the hydrous contents are driven off it assumes a dark brown or blackish color and may then be subjected to further treatment and be finally smelted or otherwise treated to obtain the metallic copper therefrom.

The great advantage resulting from the use of lime water in the precipitation of copper from its solution is its extreme cheapness and thoroughness as compared with other methods, as lime water can be very cheaply prepared and may be efficiently used in substitution for other methods of precipitation either on a large or a small scale and requires no costly apparatus or delicate manipulation. The use of iron, as is well known, for the purpose is costly, slow and cumbersome, while electricity and other methods now in use are expensive and require delicate manipulation.

I have found that during the precipitation which occurs after the lime water has been added to the acid solution to the required extent practically all the copper present will be carried down and the mass which is precipitated is found to be a hydrated copper compound or copper-containing mixture carrying 20% or more of copper, which when subjected to a moderate heat as hereinbefore mentioned, yields a product which carries from 25% to 40% or more of copper.

What I claim and desire to secure by Letters Patent is:

1. In the art of extracting copper from its ores, the hereindescribed process which consists in adding lime water to an acid solution containing copper whereby to effect the precipitation of the copper contained in said solution.

2. In the art of extracting copper from its ores, the hereindescribed process which consists in adding lime water in excess to an acid solution containing copper whereby to effect the precipitation of the copper contained in said solution.

3. In the art of extracting copper from its ores, the hereindescribed process which consists in leaching the ore with an acid solution, filtering the solution, adding lime water in excess until the mass shows an alkaline reaction, allowing the precipitate to settle, and then running off the liquid.

4. In the art of extracting copper from its ores, the hereindescribed process which consists in adding lime water in excess to an acid solution containing copper whereby to effect the precipitation of the copper contained in said solution, running off the liquid, and then subjecting the precipitate to moderate heat.

In testimony whereof I affix my signature in presence of two witnesses.

GEORGE B. CHITTENDEN.

Witnesses:
WM. E. BOULTER,
THOMAS BRADLEY.